(12) United States Patent
Sunaga

(10) Patent No.: US 9,066,178 B2
(45) Date of Patent: Jun. 23, 2015

(54) AUDIO PROCESSING APPARATUS

(71) Applicant: Onkyo Corporation, Osaka (JP)

(72) Inventor: Tadaharu Sunaga, Osaka (JP)

(73) Assignee: Onkyo Corporation, Neyagawa-shi (JP)

( * ) Notice: Subject to any disclaimer, the term of this patent is extended or adjusted under 35 U.S.C. 154(b) by 375 days.

(21) Appl. No.: 13/746,459

(22) Filed: Jan. 22, 2013

(65) Prior Publication Data

US 2013/0190909 A1 Jul. 25, 2013

(30) Foreign Application Priority Data

Jan. 25, 2012 (JP) .................................. 2012-13047

(51) Int. Cl.
| | | |
|---|---|---|
| *H04R 5/04* | (2006.01) | |
| *H04S 3/00* | (2006.01) | |
| *H03F 3/68* | (2006.01) | |
| *G06F 3/16* | (2006.01) | |

(52) U.S. Cl.
CPC .. *H04R 5/04* (2013.01); *G06F 3/16* (2013.01); *H04S 3/008* (2013.01); *H04S 3/00* (2013.01); *H04R 2420/01* (2013.01); *H04R 2420/03* (2013.01)

(58) Field of Classification Search
CPC ........ H04R 5/04; H04R 2420/03; H03F 3/68; H04S 3/008
USPC ..................................... 381/123, 120; 700/94
See application file for complete search history.

(56) References Cited

U.S. PATENT DOCUMENTS

| | | | | |
|---|---|---|---|---|
| 6,167,140 A | * | 12/2000 | Watanabe | ...................... 381/123 |
| 8,054,998 B2 | * | 11/2011 | Okamura et al. | ............. 381/123 |
| 8,270,631 B2 | * | 9/2012 | Kusunoki | ...................... 381/123 |
| 2010/0195848 A1 | | 8/2010 | Sunaga et al. | |
| 2011/0243334 A1 | | 10/2011 | Misaki et al. | |

FOREIGN PATENT DOCUMENTS

| | | |
|---|---|---|
| EP | 2 375 789 A2 | 10/2011 |
| JP | 2011-229113 | 11/2011 |

OTHER PUBLICATIONS

European Search Report for corresponding European Application No. 13151570.2 dated Apr. 29, 2013.

* cited by examiner

*Primary Examiner* — Jesse Elbin
(74) *Attorney, Agent, or Firm* — Renner, Otto, Boisselle & Sklar, LLP

(57) ABSTRACT

A pre-out terminal that outputs a left outside audio signal can be fixed and an increase of the number of DACs is prevented. In the case that a surround back left audio signal SBL and a left outside audio signal LW are included, the signal SBL is amplified and output to a surround back left SP terminal 14*a* through a switch S13*a*. The signal LW is amplified and output to a left outside SP terminal 14*b* through a switch S13*c*. The signal LW is supplied from a DAC 11*b* to a left outside pre-out terminal 11*d* through a switch S11*c*. At this point, in order to supply the signal LW to the left outside pre-out terminal 11*d*, a DAC 11*c* is not used, but the DAC 11*b* is used. Accordingly, the DAC 11*c* can be used for another signal (ex., ZONE2) to decrease the number of DACs.

2 Claims, 12 Drawing Sheets

AUDIO PROCESSING APPARATUS

BACKGROUND OF THE INVENTION

1. Field of the Invention

The present invention relates to an audio processing apparatus that plays back multichannel audio data.

2. Description of the Related Art

An audio playback system including a BD (Blue-ray disc) player, an AV amplifier, and a display device is used. Audio data transmitted from the BD player to the AV amplifier is generated by encoding multichannel audio data. For example, as illustrated in FIG. 3, the multichannel audio data includes a left audio signal L, a right audio signal R, a central audio signal C, a low-frequency audio signal SW, a surround left audio signal SL, and a surround right audio signal SR. Recently HD (High Definition)-related audio formats, such as Dolby True HD, Dolby Digital Plus, and DTS-HD, which are used in a BD player, appear on the scene. A surround back left audio signal SBL, a surround back right audio signal SBR, a left outside audio signal LW, a right outside audio signal RW, a left upside audio signal LH, and a right upside audio signal RH are further added in the HD-related audio formats.

However, when amplifiers corresponding to the audio signals of all the channels are provided in the AV amplifier, it is necessary to provide the amplifiers for the total of 11.1 channels, which results in a problem in that a cost increases significantly. The same holds true for the case that, as illustrated in FIG. 10, a left-central-side audio signal LC and a right-central-side audio signal RC are added instead of any one of the extended channels (or in addition to the extended channels). The same also holds true for the case that the AV amplifier generates the extended channels in a DSP according to a listening mode.

An audio processing apparatus in FIG. 12 is conceivable for the purpose of solving the problem. According to the audio processing apparatus, in the case that the surround back left audio signal SBL and the left upside audio signal LH are included, the surround back left audio signal SBL is supplied from a DAC 511a to an amplifier 512a, and the left upside audio signal LH is supplied from a DAC 511b to an amplifier 512b. Switches S513a and S513d are controlled in an on state, and switches S513b and S513c are controlled in an off state. Therefore, the surround back left audio signal SBL amplified by the amplifier 512a is supplied to a surround back left SP terminal 514a, and the left upside audio signal LH amplified by the amplifier 512b is supplied to a left upside SP terminal 514c (see Japanese Unexamined Patent Publication No. 2011-229113).

In the case that the surround back left audio signal SBL and the left outside audio signal LW are included, the surround back left audio signal SBL is supplied from the DAC 511a to the amplifier 512a, and the left outside audio signal LW is supplied from the DAC 511b to the amplifier 512b. The switches S513a and S513c are controlled in the on state, and switches S513b and S513d are controlled in the off state. Therefore, the surround back left audio signal SBL amplified by the amplifier 512a is supplied to the surround back left SP terminal 514a, and the left outside audio signal LW amplified by the amplifier 512b is supplied to a left outside SP terminal 514b. The left outside audio signal LW is also output from a pre-out terminal 511d. Accordingly, another amplifier device is connected to the pre-out terminal 511d, and the left outside audio signal LW amplified by another amplifier device can also be played back.

In the case that the left outside audio signal LW and the left upside audio signal LH are included, the left outside audio signal LW is supplied from the DAC 511a to the amplifier 512a, and the left upside audio signal LH is supplied from the DAC 511b to the amplifier 512b. The switches S513b and S513d are controlled in the on state, and the switches S513a and S513c are controlled in the off state. Therefore, the left outside audio signal LW amplified by the amplifier 512a is supplied to the left outside SP terminal 514b, and the left upside audio signal LH amplified by the amplifier 512b is supplied to the left upside SP terminal 514c. The left outside audio signal LW is also output from a pre-out terminal 511c. Accordingly, another amplifier device is connected to the pre-out terminal 511c, and the left outside audio signal LW amplified by another amplifier device can also be played back.

At this point, according to the audio processing apparatus, unfortunately the pre-out terminal that outputs the left outside audio signal LW varies depending on the case that the surround back left audio signal SBL and the left outside audio signal LW are included and the case that the left outside audio signal LW and the left upside audio signal LH are included. That is, it is necessary to change an input terminal of another amplifier, which is connected to the pre-out terminal, according to a combination of channels included in the multichannel audio data.

For example, when an additional DAC is provided to always supply the left outside audio signal LW from the additional DAC to the fixed pre-out terminal, the problem that the pre-out terminal outputting the left outside audio signal LW varies can be solved. However, in the audio processing apparatus, it is necessary to provide the DAC for other uses, such as an output of an HDMI signal of ZONE2, and the number of DACs increases, which results in a problem of a cost increase.

SUMMARY OF THE INVENTION

The present invention is devised in order to solve the above conventional problem, and its object is to provide an audio processing apparatus, in which the pre-out terminal that outputs the second extended left audio signal (or the second extended right audio signal) can be fixed and the increase of the number of digital-analog converters is prevented.

An audio processing apparatus according to a preferred embodiment of the present invention comprises: a first amplifier that amplifies a first extended left audio signal (or a first extended right audio signal) or a second extended left audio signal (or a second extended right audio signal); a second amplifier that amplifies a second extended left audio signal or a third extended left audio signal (or a third extended right audio signal); a first digital-analog converter that supplies one of the first extended left audio signal and the second extended left audio signal to the first amplifier; a second digital-analog converter that supplies one of the second extended left audio signal and the third extended left audio signal to the second amplifier; a third digital-analog converter that outputs the second extended left audio signal to a second extended left audio signal pre-out terminal; a first speaker terminal that outputs the first extended left audio signal; a second speaker terminal that outputs the second extended left audio signal; a third speaker terminal that outputs the third extended left audio signal; a first switch that switches whether the first extended left audio signal is supplied from the first amplifier to the first speaker terminal; a second switch that switches whether the second extended left audio signal is supplied from the first amplifier to the second speaker terminal; a third switch that switches whether the second extended left audio signal is supplied from the second amplifier to the second speaker terminal; a fourth switch that switches whether the third extended left audio signal is supplied from the second amplifier to the third speaker terminal; a fifth switch that switches whether the second extended left audio signal is supplied from the third digital-analog converter to the second extended left audio signal pre-out terminal; a sixth switch that switches whether the second extended left audio signal is supplied from the first digital-analog converter to the second extended left audio signal pre-out terminal; a seventh switch that switches whether the second extended left audio signal is supplied from the second digital-analog converter to the second extended left audio signal pre-out terminal; a channel determination unit that determines whether the first extended left audio signal, the second extended left audio signal, or the third extended left audio signal is included in multichannel audio data; and a switching controller that causes the first switch to supply the first extended left audio signal amplified by the first amplifier to the first speaker terminal, causes the fourth switch to supply the third extended left audio signal amplified by the second amplifier to the third speaker terminal, and causes the fifth switch to supply the second extended left audio signal from the third digital-analog converter to the second extended left audio signal pre-out terminal when determining that all the first extended left audio signal, the second extended left audio signal, and the third extended left audio signal are included, the switching controller causing the first switch to supply the first extended left audio signal amplified by the first amplifier to the first speaker terminal, causing the third switch to supply the second extended left audio signal amplified by the second amplifier to the second speaker terminal, and causing the seventh switch to supply the second extended left audio signal from the second digital-analog converter to the second extended left audio signal pre-out terminal when determining that the first extended left audio signal and the second extended left audio signal are included, the switching controller causing the second switch to supply the second extended left audio signal amplified by the first amplifier to the second speaker terminal, causing the fourth switch to supply the third extended left audio signal amplified by the second amplifier to the third speaker terminal, and causing the sixth switch to supply the second extended left audio signal from the first digital-analog converter to the second extended left audio signal pre-out terminal when determining that the second extended left audio signal and the third extended left audio signal are included.

When determining that all the first extended left audio signal, the second extended left audio signal, and the third extended left audio signal are included, the first switch is caused to supply the first extended left audio signal amplified by the first amplifier to the first speaker terminal, the fourth switch is caused to supply the third extended left audio signal amplified by the second amplifier to the third speaker terminal, and the fifth switch is caused to supply the second extended left audio signal from the third digital-analog converter to the second extended left audio signal pre-out terminal. Accordingly, all the first extended left audio signal, the second extended left audio signal, and the third extended left audio signal can be played back.

When determining that the first extended left audio signal and the second extended left audio signal are included, the first switch is caused to supply the first extended left audio signal amplified by the first amplifier to the first speaker terminal, the third switch is caused to supply the second extended left audio signal amplified by the second amplifier to the second speaker terminal, and the seventh switch is caused to supply the second extended left audio signal from the second digital-analog converter to the second extended left audio signal pre-out terminal. Accordingly, the first extended left audio signal and the second extended left audio signal can be played back. The second digital-analog converter is used as the digital-analog converter that supplies the second extended left audio signal to the second extended left audio signal pre-out terminal, so that the third digital-analog converter can be used for another signal. Accordingly, the increase of the number of digital-analog converters can be prevented.

When determining that the second extended left audio signal and the third extended left audio signal are included, the second switch is caused to supply the second extended left audio signal amplified by the first amplifier to the second speaker terminal, the fourth switch is caused to supply the third extended left audio signal amplified by the second amplifier to the third speaker terminal, and the sixth switch is caused to supply the second extended left audio signal from the first digital-analog converter to the second extended left audio signal pre-out terminal. Accordingly, the second extended left audio signal and the third extended left audio signal can be played back. The first digital-analog converter is used as the digital-analog converter that supplies the second extended left audio signal to the second extended left audio signal pre-out terminal, so that the third digital-analog converter can be used for another signal. Accordingly, the increase of the number of digital-analog converters can be prevented. As described above, the second extended left audio signal pre-out terminal that outputs the second extended left audio signal can be fixed.

In a preferred embodiment, the first extended left audio signal is any one of a surround back left audio signal, a left outside audio signal, a left upside audio signal, and a left-central-side audio signal (or the first extended right audio signal is any one of a surround back right audio signal, a right outside audio signal, a right upside audio signal, and a right-central-side audio signal), the second extended left audio signal is any one of the surround back left audio signal, the left outside audio signal, the left upside audio signal, and the left-central-side audio signal and is different from the first extended left audio signal (or the second extended right audio signal is any one of the surround back right audio signal, the right outside audio signal, the right upside audio signal, and the right-central-side audio signal and is different from the first extended right audio signal), and the third extended left audio signal is any one of the surround back left audio signal, the left outside audio signal, the left upside audio signal, and the left-central-side audio signal and is different from the first extended left audio signal and the second extended left audio signal (or the third extended right audio signal is any one of the surround back right audio signal, the right outside audio signal, the right upside audio signal, and the right-central-side audio signal and is different from the first extended right audio signal and the second extended right audio signal).

The audio processing apparatus, in which the pre-out terminal that outputs the second extended left audio signal (or the second extended right audio signal) can be fixed and the increase of the number of digital-analog converters is prevented, can be provided.

DETAILED DESCRIPTION OF THE PREFERRED EMBODIMENTS

Figure 1:
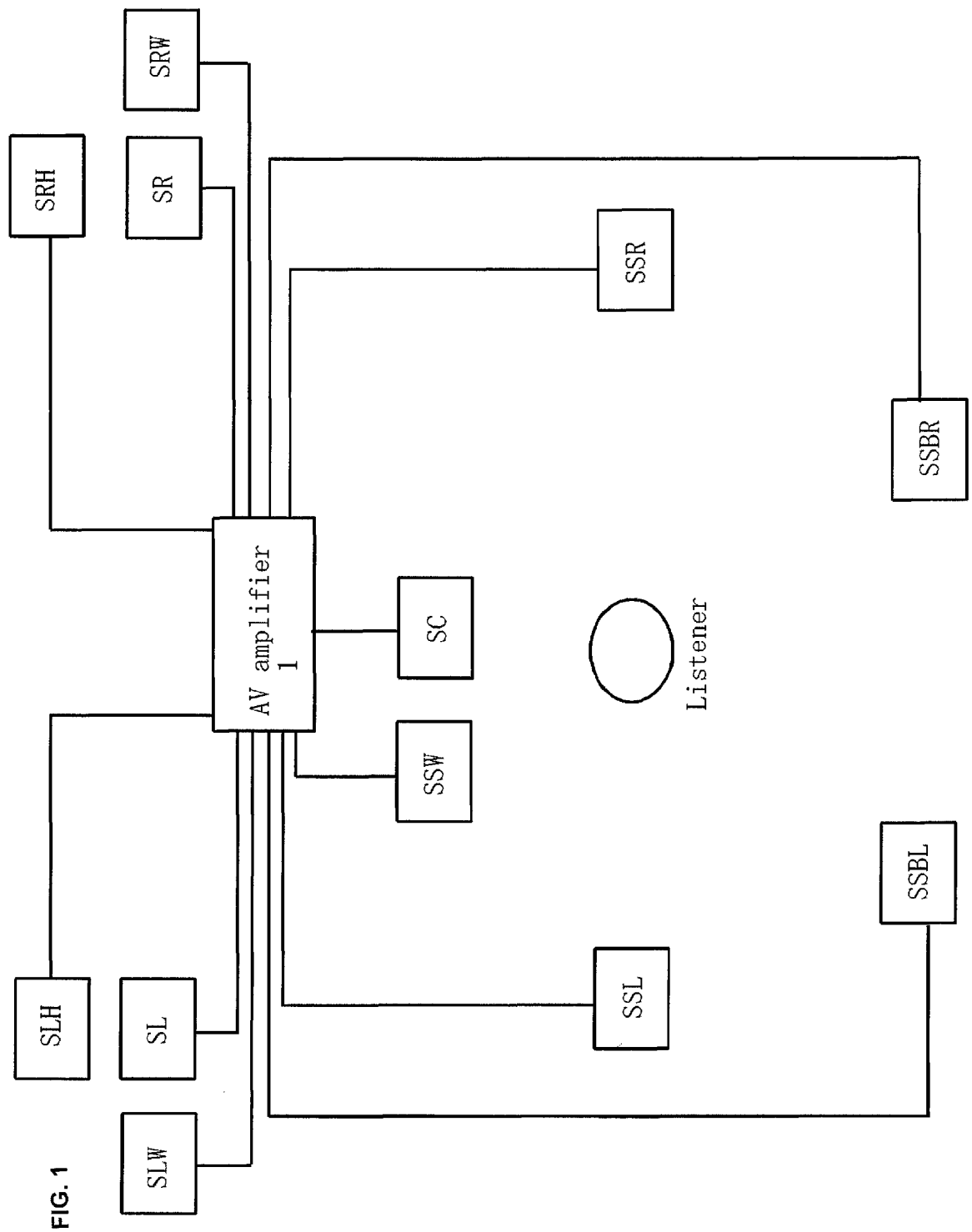
FIG. 1 is a view illustrating dispositions of an AV amplifier and speakers.

Hereinafter, an audio playback system including a disk playback apparatus (hereinafter referred to as a BD player), an audio processing apparatus (hereinafter referred to as an AV amplifier), and a display device according to preferred embodiments of the present invention will specifically be described with reference to the drawings. However, the present invention is not limited to the embodiments. FIG. 1 is a view illustrating an example of dispositions of an AV amplifier 1 and speakers according to a first embodiment. A left speaker SL, a right speaker SR, a central speaker SC, a low-frequency speaker SSW, a surround left speaker SSL, a surround right speaker SSR, a surround back left speaker SSBL, a surround back right speaker SSBR, a left upside speaker SLH, a right upside speaker SRH, a left outside speaker SLW, and a right outside speaker SRW are connected to the AV amplifier 1.

Figure 2:
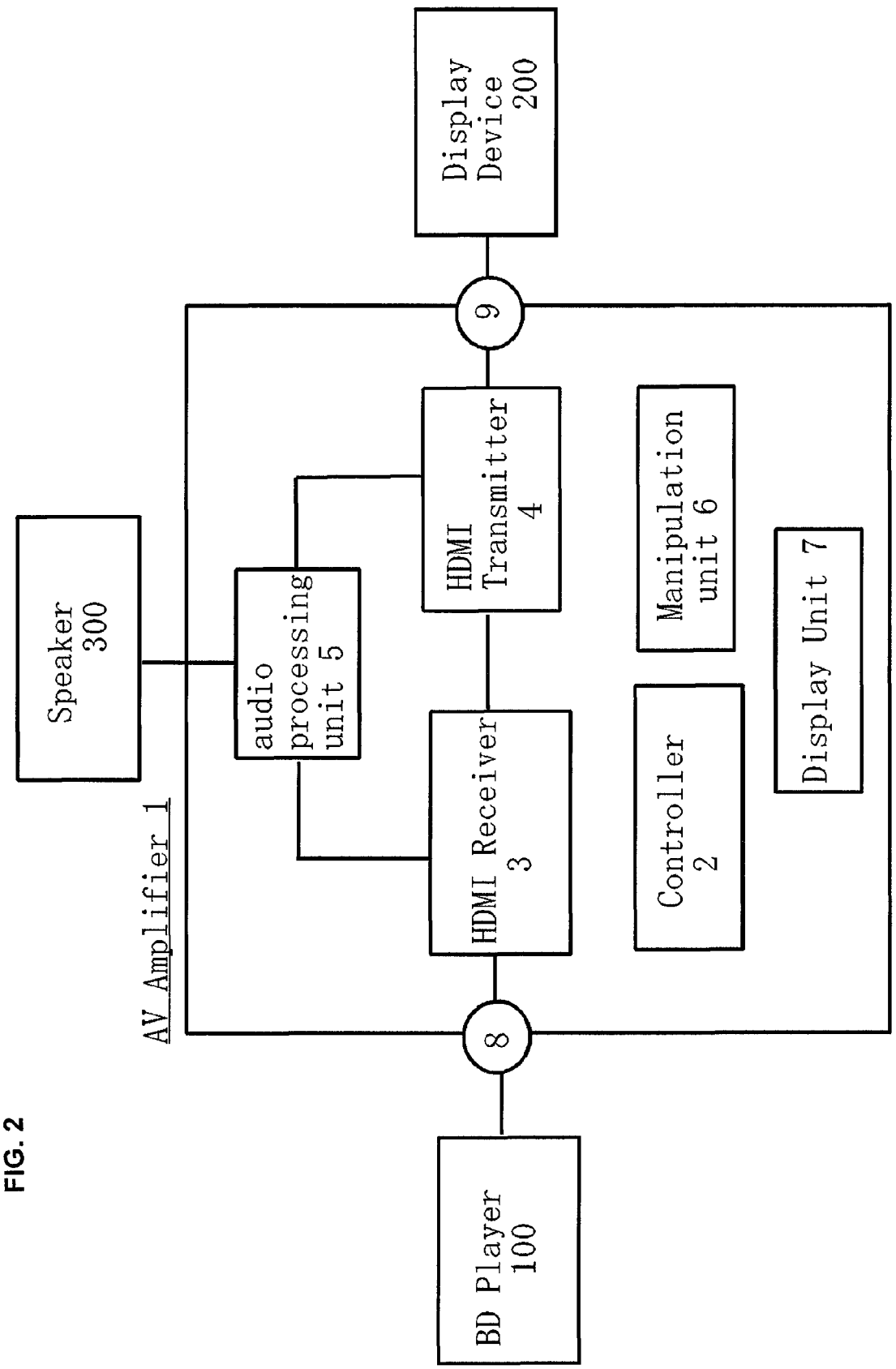
FIG. 2 is a view illustrating an audio playback system.

FIG. 2 is a block diagram illustrating a configuration of an audio playback system. For example, a BD player 100, the AV amplifier 1, and a display device 200 are compliant with an HDMI standard, and are connected to one another through an HDMI cable. The BD player 100 transmits HDMI data including multichannel audio data and video data to the AV amplifier 1. The AV amplifier 1 amplifies the multichannel audio data, which is received from the BD player 100 and included in the HDMI data, and outputs the multichannel audio data to the speakers. The AV amplifier 1 transmits the HDMI data including the video data to the display device 200. The display device 200 displays the video data, which is received from the AV amplifier 1 and included in the HDMI data.

The AV amplifier 1 includes a controller 2, an HDMI receiver 3, an HDMI transmitter 4, an audio processing unit 5, a manipulation unit 6, a display unit 7, and HDMI terminals 8 and 9. A speaker 300 (corresponding to the speakers in FIG. 1) is connected to the AV amplifier 1.

The HDMI receiver 3 receives the HDMI data transmitted from the BD player 100, generates original video data from the received HDMI data, and supplies the original video data to the HDMI transmitter 4. The HDMI receiver 3 generates original multichannel audio data from the received HDMI data, and supplies the original multichannel audio data to the audio processing unit 5.

Figure 3:
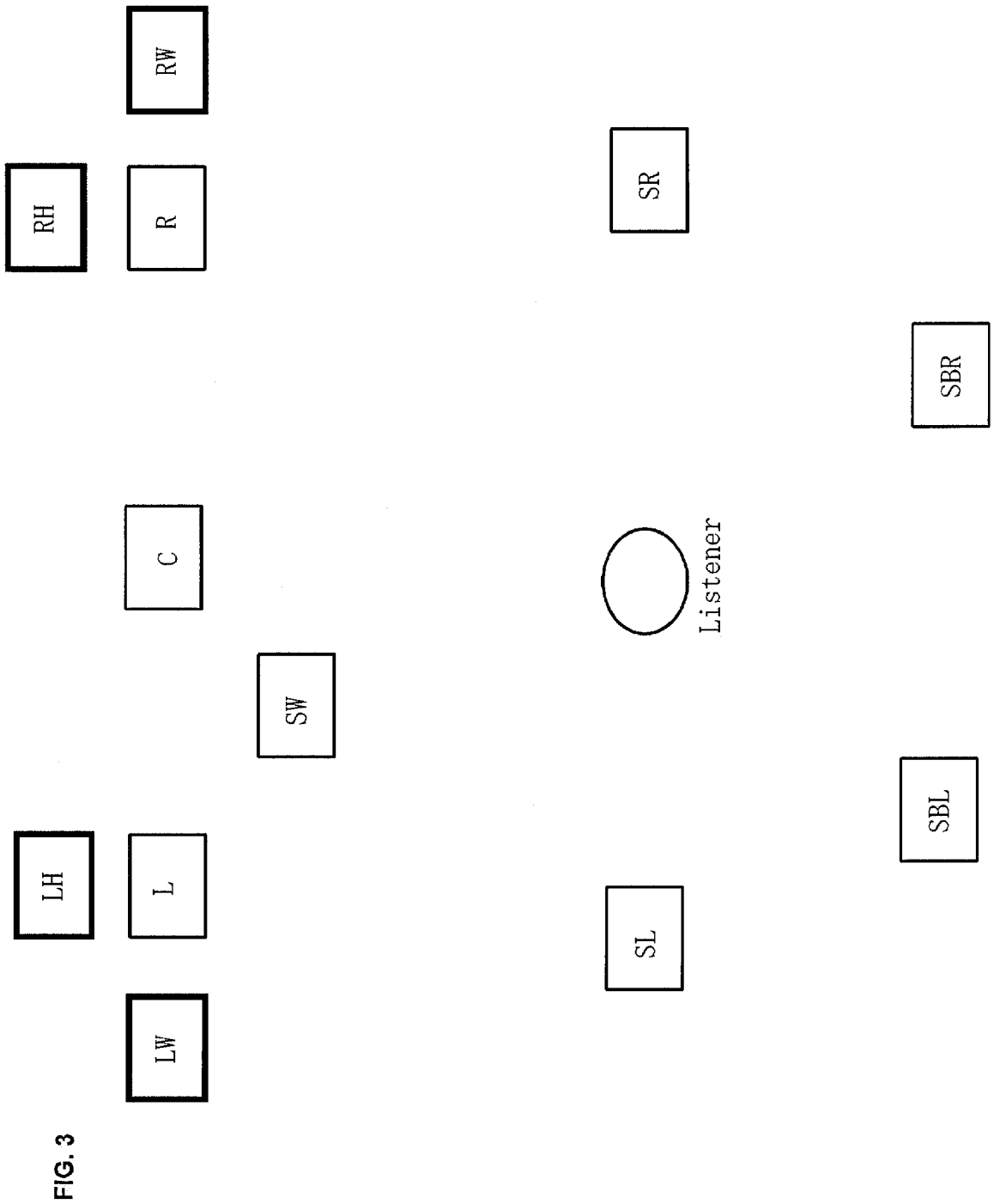
FIG. 3 is a view illustrating channels of audio signals.

The audio processing unit 5 decodes the multichannel audio data supplied from the HDMI receiver 3, performs pieces of processing, such as acoustic processing, D/A conversion processing, a volume adjusting processing, and amplifying processing, and supplies an audio signal of each channel to the speaker 300. The multichannel audio data supplied to the audio processing unit 5 will be described. As illustrated in FIG. 3, for example, HD (High Definition)-related audio formats, such as Dolby True HD, Dolby Digital Plus, and DTS-HD include a left audio signal L (front left audio signal), a right audio signal R (front right audio signal), a central audio signal C, a low-frequency audio signal SW, a surround left audio signal SL, a surround right audio signal SR, a surround back left audio signal SBL, a surround back right audio signal SBR, a left outside audio signal LW, a right outside audio signal RW, an left upside audio signal LH, and an right upside audio signal RH.

The surround back left audio signal SBL is played back from a position on a back left side of a user. The surround back right audio signal SBR is played back from a position on a back right side of the user. The left outside audio signal LW is played back from a position (that is, on a front left outside of the user) of an outside (a left side) of the left audio signal L. The right outside audio signal RW is played back from a position (that is, on a front right outside of the user) of an outside (a right side) of the right audio signal R. The left upside audio signal LH is played back from a position (that is, on a front left upside of the user) of an upside of the left audio signal L. The right upside audio signal RH is played back from a position (that is, on a front right upside of the user) of the upside of the right audio signal R.

Figure 4:
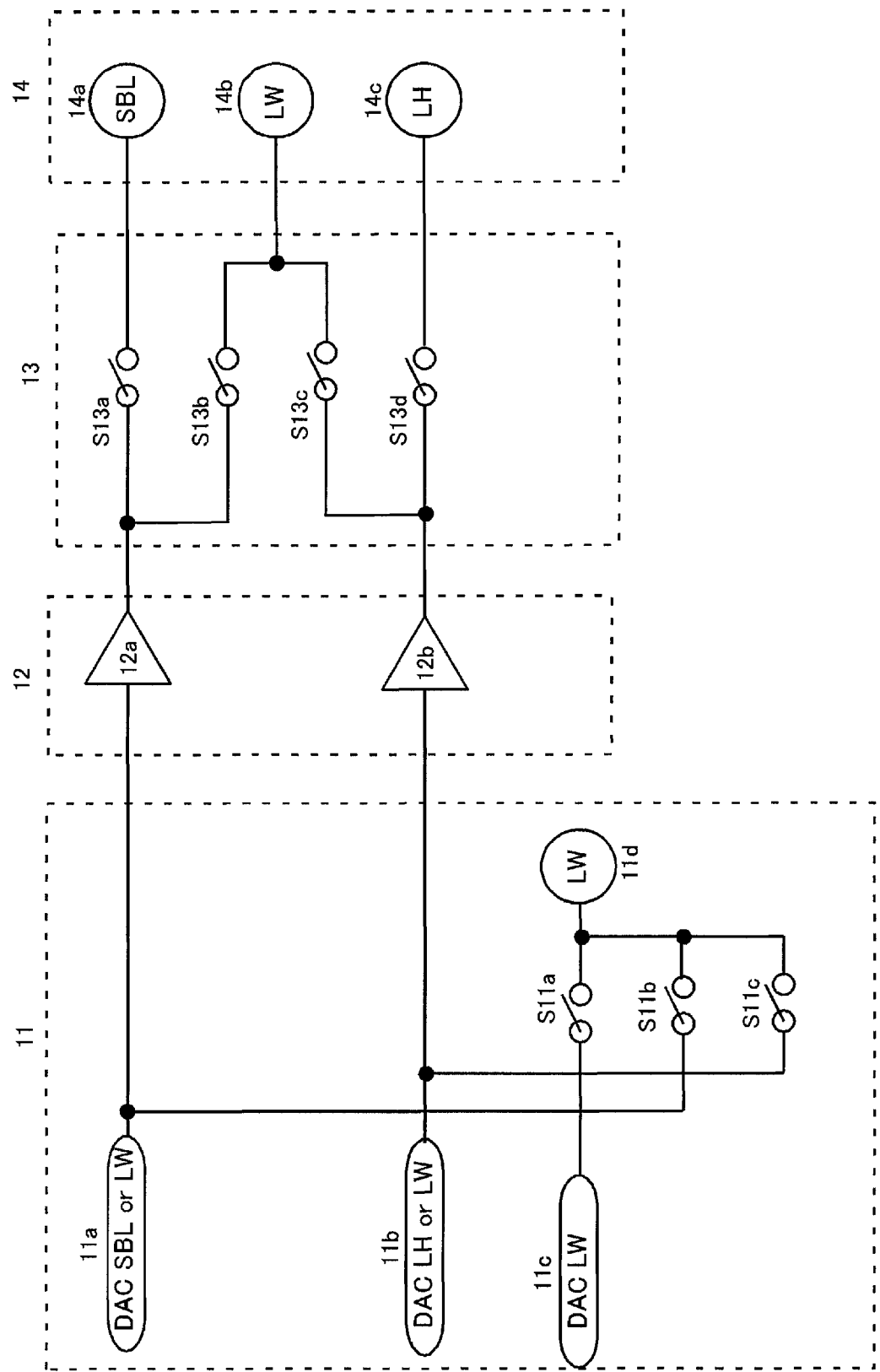
FIG. 4 is a view illustrating an audio processing unit.
Figure 5:
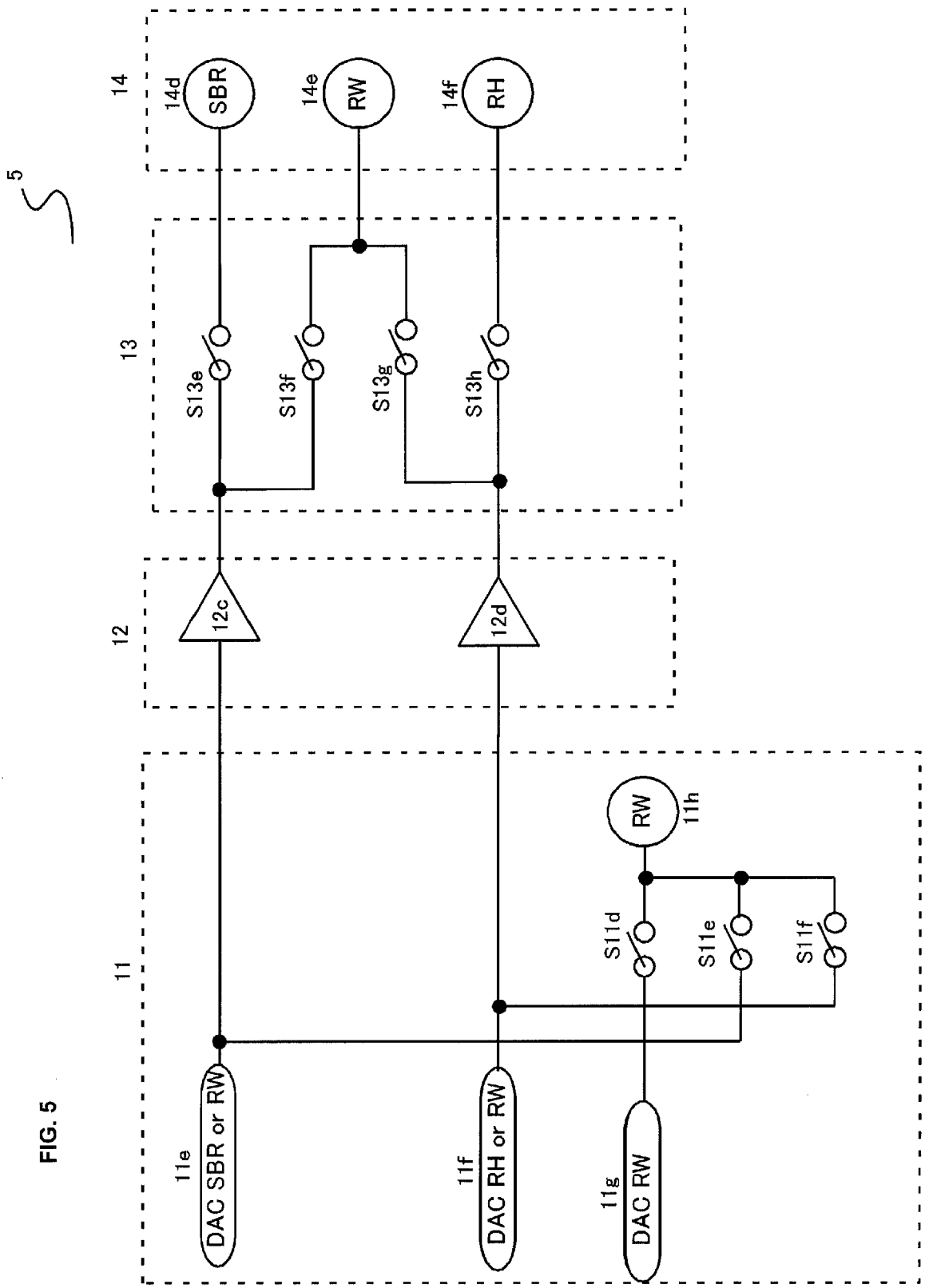
FIG. 5 is a view illustrating an audio processing unit.

FIGS. 4 and 5 are block diagrams illustrating a main part of the audio processing unit 5. FIG. 4 illustrates a configuration related to a left channel, and FIG. 5 illustrates a configuration related to a right channel. The audio processing unit 5 includes a pre-out unit 11, a power amplifier 12, an SP (speaker) relay 13, and an SP (speaker) terminal 14. In FIGS. 4 and 5, because circuits related to basic 5.1 channels (the left audio signal L, the right audio signal R, the central audio signal C, the low-frequency audio signal SW, the surround left audio signal SL, and the surround right audio signal SR) are identical to those of the related art, the circuits are omitted. A DSP provided at a front-stage of the pre-out unit 11 is also omitted.

The DSP decodes the multichannel audio data supplied from the HDMI receiver 3, and generates the audio data of each channel. The generated audio data is supplied to the pre-out unit 11.

The pre-out unit 11 includes DACs (Digital-Analog Converters) 11a, 11b, 11c, 11e, 11f, and 11g, switches S11a to S11f, a left outside pre-out terminal 11d, and a right outside pre-out terminal 11h.

One of the surround back left audio signal SBL and the left outside audio signal LW is selectively input from the DSP to the DAC 11a, and the DAC 11a performs digital-analog conversion to the input signal. The DAC 11a supplies one of the surround back left audio signal SBL and the left outside audio signal LW to an amplifier 12a and the switch S11b.

One of the left upside audio signal LH and the left outside audio signal LW is selectively input from the DSP to the DAC 11b, and the DAC 11b performs the digital-analog conversion to the input signal. DAC 11b supplies one of the left upside audio signal LH and the left outside audio signal LW to an amplifier 12b and the switch S11c.

The left outside audio signal LW is input from the DSP to the DAC 11c, and the DAC 11c performs the digital-analog conversion to the input signal. The DAC 11c supplies the input left outside audio signal LW to the switch S11a.

The switch Sila switches whether the left outside audio signal LW input from the DAC 11c is output to the left outside pre-out terminal 11d. The switch S11b switches whether the left outside audio signal LW input from the DAC 11a is output to the left outside pre-out terminal 11d. The switch S11c switches whether the left outside audio signal LW input from the DAC 11b is output to the left outside pre-out terminal 11d. Any one of the switches Sila to S11c is put into the on state in response to an instruction from the controller 2.

One of the surround back right audio signal SBR and the right outside audio signal RW is selectively input from the DSP to the DAC 11$e$, and the DAC 11$e$ performs the digital-analog conversion to the input signal. The DAC 11$e$ supplies one of the surround back right audio signal SBR and the right outside audio signal RW to an amplifier 12$c$ and the switch S11$e$.

One of the right upside audio signal RH and the right outside audio signal RW is selectively input from the DSP to the DAC 11$f$, and the DAC 11$f$ performs the digital-analog conversion to the input signal. The DAC 11$f$ supplies one of the right upside audio signal RH and the right outside audio signal RW to an amplifier 12$d$ and the switch S11$f$.

The right outside audio signal RW is input from the DSP to the DAC 11$g$, and the DAC 11$g$ performs the digital-analog conversion to the input signal. The DAC 11$g$ supplies the input right outside audio signal RW to a switch S1id.

The switch S11$d$ switches whether the right outside audio signal RW input from the DAC 11$g$ is output to the right outside pre-out terminal 11$h$. The switch S11$e$ switches whether the right outside audio signal RW input from the DAC lie is output to the right outside pre-out terminal 11$h$. The switch S11$f$ switches whether the right outside audio signal RW input from the DAC 11$f$ is output to the right outside pre-out terminal 11$h$. Any one of the switches S11$d$ to S11$f$ is put into the on state in response to an instruction from the controller 2.

The power amplifier 12 includes the amplifiers 12$a$ to 12$d$. The amplifier 12$a$ amplifies the surround back left audio signal SBL or the left outside audio signal LW, which is supplied from the DAC 11$a$, and supplies the amplified signal to the SP relay 13 (switches S13$a$ and S13$b$). The amplifier 12$b$ amplifies the left upside audio signal LH or the left outside audio signal LW, which is supplied from the DAC 11$b$, and supplies the amplified signal to the SP relay 13 (switches S13$c$ and S13$d$).

The amplifier 12$c$ amplifies the surround back right audio signal SBR or the right outside audio signal RW, which is supplied from the DAC lie, and supplies the amplified signal to the SP relay 13 (switches S13$e$ and S13$f$). The amplifier 12$d$ amplifies the right upside audio signal RH or the right outside audio signal RW, which is supplied from the DAC 11$f$, and supplies the amplified signal to the SP relay 13 (switches S13$g$ and S13$h$).

The SP relay 13 includes relay switches (hereinafter referred to as switches) S13$a$ to S13$h$. The switch S13$a$ switches whether the surround back left audio signal SBL supplied from the amplifier 12$a$ is supplied to a surround back left SP terminal 14$a$. The switch S13$b$ switches whether the left outside audio signal LW supplied from the amplifier 12$a$ is supplied to a left outside SP terminal 14$b$. The switch S13$c$ switches whether the left outside audio signal LW supplied from the amplifier 12$b$ is supplied to the left outside SP terminal 14$b$. The switch S13$d$ switches whether the left upside audio signal LH supplied from the amplifier 12$b$ is supplied to a left upside SP terminal 14$c$. The switches S13$a$ to S13$d$ are switched according to the channel included in the multichannel audio data.

The switch S13$e$ switches whether the surround back right audio signal SBR supplied from the amplifier 12$c$ is supplied to a surround back right SP terminal 14$d$. The switch S13$f$ switches whether the right outside audio signal RW supplied from the amplifier 12$c$ is supplied to a right outside SP terminal 14$e$. The switch S13$g$ switches whether the right outside audio signal RW supplied from the amplifier 12$d$ is supplied to the right outside SP terminal 14$e$. The switch S13$h$ switches whether the right upside audio signal RH supplied from the amplifier 12$d$ is supplied to the right upside SP terminal 14$f$. The switches S13$e$ to S13$h$ are switched according to the channel included in the multichannel audio data.

The SP terminal 14 includes the SP terminals 14$a$ to 14$f$. The surround back left speaker SSBL is connected to the surround back left SP terminal 14$a$. The left outside speaker SLW is connected to the left outside SP terminal 14$b$. The left upside speaker SLH is connected to the left upside SP terminal 14$c$. The surround back right speaker SSBR is connected to the surround back right SP terminal 14$d$. The right outside speaker SRW is connected to the right outside SP terminal 14$e$. The right upside speaker SRH is connected to the right upside SP terminal 14$f$.

Referring to FIG. 2, the HDMI transmitter 4 converts the video data supplied from the HDMI receiver 3 into the HDMI data, and transmits the HDMI data to the display device 200.

The controller 2 controls each unit based on an operating program of the AV amplifier, which is stored in a built-in or connected memory (not illustrated). For example, the controller 2 is a microcomputer or a CPU and the like. The controller 2 determines the channel included in the multichannel audio data (that is, the channel to be played back), controls the audio signal supplied from the DSP to the DACs 11$a$ to 11$c$ and 11$e$ to 11$g$, and performs the switching control of the switches S11$a$ to S11$f$ and 513$a$ to 513$h$. (The multichannel audio data is not limited to the audio data received from the BD player 100, but the multichannel audio data may be the audio data that is generated and output by the DSP.)

When determining that the surround back left audio signal SBL is included, the controller 2 causes the switch 513$a$ to supply the surround back left audio signal SBL amplified by the amplifier 12$a$ to the SP terminal 14$a$. When determining that the left outside audio signal LW is included, the controller 2 causes the switch 513$b$ to supply the left outside audio signal LW amplified by the amplifier 12$a$ to the SP terminal 14$b$, or causes the switch 513$c$ to supply the left outside audio signal LW amplified by the amplifier 12$b$ to the SP terminal 14$b$. When determining that the left upside audio signal LH is included, the controller 2 causes the switch 513$d$ to supply the left upside audio signal LH amplified by the amplifier 12$b$ to the SP terminal 14$c$. The same holds true for each right signal.

When determining that the left outside audio signal LW is included, the controller 2 puts any one of the switches S11$a$ to S11$c$ into the on state to supply the left outside audio signal LW to the left outside pre-out terminal 11$d$. The same holds true for the right outside audio signal RW.

The HDMI receiver 3 generates the original multichannel audio data from the HDMI data, and supplies the original multichannel audio data to the audio processing unit 5. The audio processing unit 5 decodes the multichannel audio data, reads channel information included in an information domain of the multichannel audio data, and supplies the channel information to the controller 2.

Figure 6:
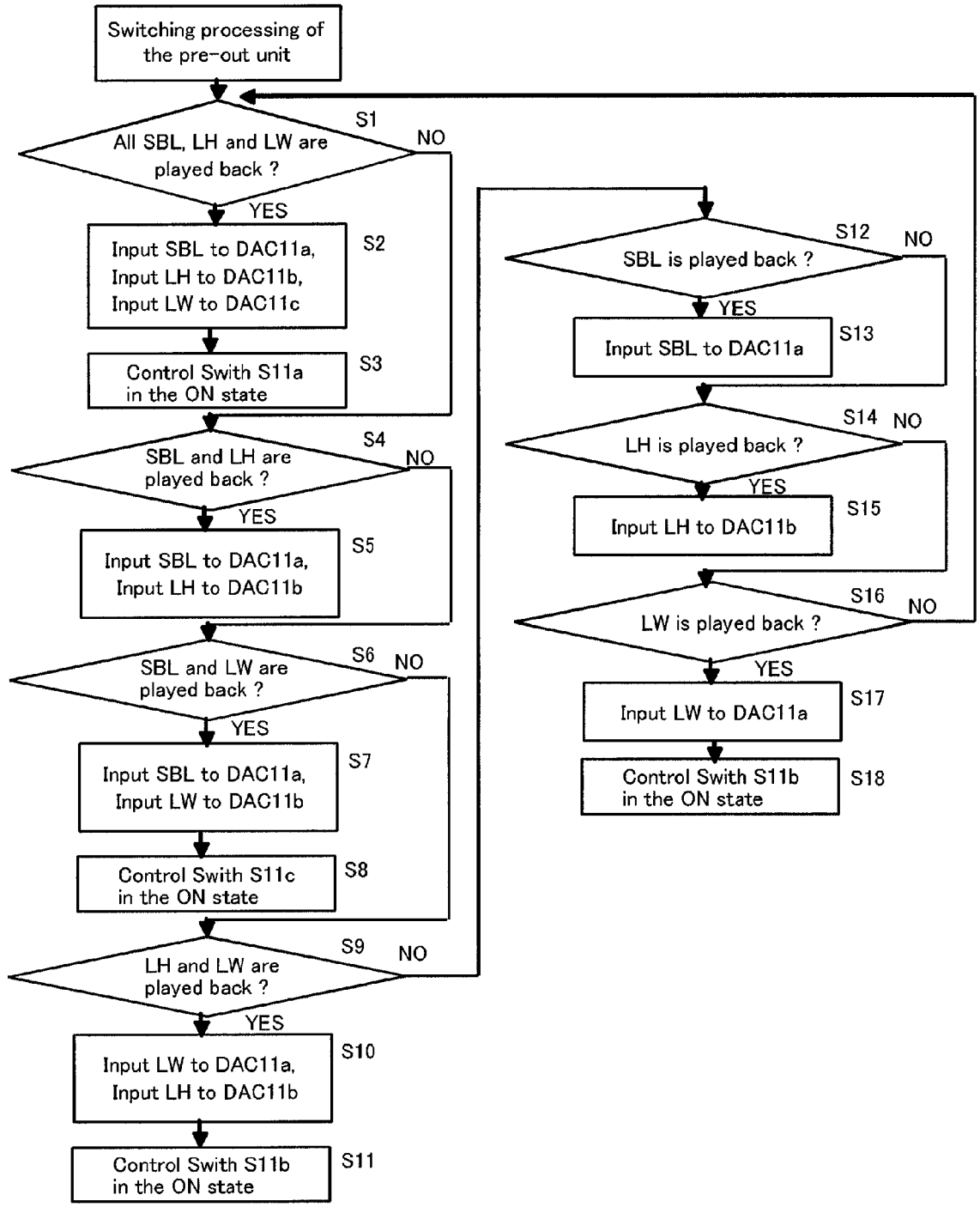
FIG. 6 is a flowchart illustrating processing of a controller.
Figure 7:
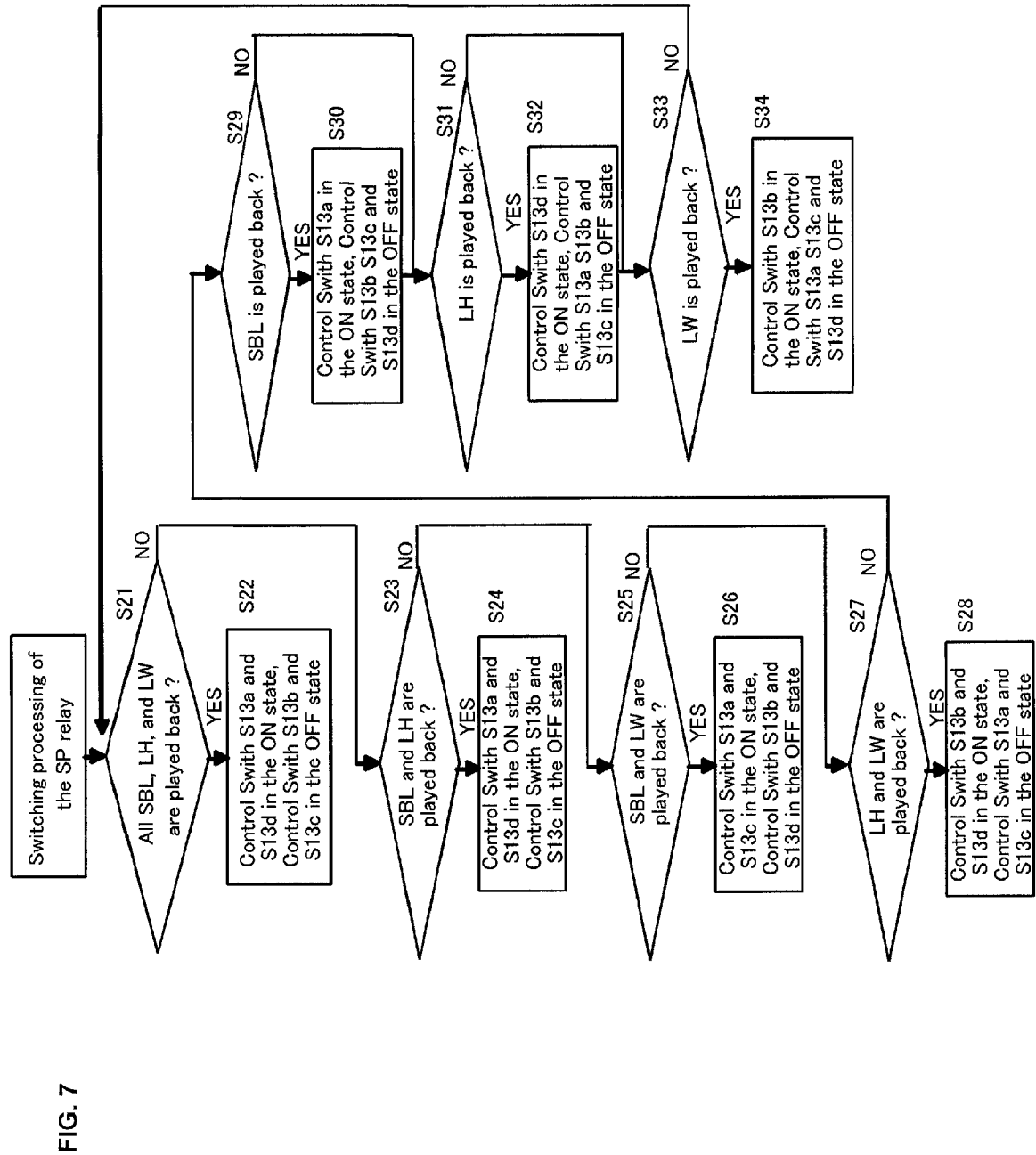
FIG. 7 is a flowchart illustrating processing of the controller.

An operation of the first embodiment will be described below. FIG. 6 is a flowchart illustrating switching processing of the pre-out unit 11 of the controller 2. FIG. 7 is a flowchart illustrating SP relay switching processing of the controller 2. Although the description is made for only each left channel in the first embodiment, the same holds true for each right channel. The controller 2 determines channel information on the input signal included in the supplied multichannel audio data in the surround back left audio signal SBL, the left upside audio signal LH, and the left outside audio signal LW. That is, the controller 2 determines the channel to be played back in the surround back left audio signal SBL, the left upside audio signal LH, and the left outside audio signal LW.

(The Case that all Signals SBL, LH, and LW are Included)

As illustrated in FIG. 6, the controller 2 determines whether all the surround back left audio signal SBL, the left upside audio signal LH, and the left outside audio signal LW are included, namely, whether all the signals SBL, LH, and LW are played back (S1). When the controller 2 makes the negative determination in S1, the processing goes to S4. On the other hand, when determining that all the signals SBL, LH, and LW are played back (YES in S1), the controller 2 inputs the surround back left audio signal SBL from the DSP to the DAC 11a, inputs the left upside audio signal LH from the DSP to the DAC 11b, and inputs the left outside audio signal LW from the DSP to the DAC 11c (S2). The controller 2 controls the switch 11a in the on state, and controls the switches 11b and 11c in the off state (S3).

As illustrated in FIG. 7, the controller 2 determines whether all the surround back left audio signal SBL, the left upside audio signal LH, and the left outside audio signal LW are included, namely, whether all the signals SBL, LH, and LW are played back (S21). When the controller 2 makes the negative determination in S21, the processing goes to S23. On the other hand, when determining that all the signals SBL, LH, and LW are played back (YES in S21), the controller 2 controls the switches S13a and S13d in the on state, and controls the switches S13b and S13c in the off state (S22).

As a result, the surround back left audio signal SBL is amplified by the amplifier 12a, and output to the surround back left SP terminal 14a through the switch S13a. The left upside audio signal LH is amplified by the amplifier 12b, and supplied to the left upside SP terminal 14c through the switch S13d. The left outside audio signal LW is supplied from the DAC 11c to the left outside pre-out terminal 11d through the switch S11a.

(The Case that Signals SBL and LH are Included)

As illustrated in FIG. 6, the controller 2 determines whether the surround back left audio signal SBL and the left upside audio signal LH are included, namely, whether the signals SBL and LH are played back (S4). When the controller 2 makes the negative determination in S4, the processing goes to S6. On the other hand, when determining that the signals SBL and LH are played back (YES in S4), the controller 2 inputs the surround back left audio signal SBL from the DSP to the DAC 11a, and inputs the left upside audio signal LH from the DSP to the DAC 11b (S5). The left outside audio signal LW is not input from the DSP to the DAC 11c. The controller 2 controls the switches 11a, 11b, and 11c in the off state.

As illustrated in FIG. 7, the controller 2 determines whether the surround back left audio signal SBL and the left upside audio signal LH are included, namely, whether the signals SBL and LH are played back (S23). When the controller 2 makes the negative determination in S23, the processing goes to S25. On the other hand, when determining that the signals SBL and LH are played back (YES in S23), the controller 2 controls the switches 513a and 513d in the on state, and controls the switches 513b and 513c in the off state (S24).

As a result, the surround back left audio signal SBL is amplified by the amplifier 12a, and output to the surround back left SP terminal 14a through the switch S13a. The left upside audio signal LH is amplified by the amplifier 12b, and supplied to the left upside SP terminal 14c through the switch S13d.

(The Case that Signals SBL and LW are Included)

As illustrated in FIG. 6, the controller 2 determines whether the surround back left audio signal SBL and the left outside audio signal LW are included, namely, whether the signals SBL and LW are played back (S6). When the controller 2 makes the negative determination in S6, the processing goes to S9. On the other hand, when determining that the signals SBL and LW are played back (YES in S6), the controller 2 inputs the surround back left audio signal SBL from the DSP to the DAC 11a, and inputs the left outside audio signal LW from the DSP to the DAC 11b (S7). The left outside audio signal LW is not input from the DSP to the DAC 11c. The controller 2 controls the switch S11c in the on state (S8), and controls the switches S11a and S11b in the off state.

As illustrated in FIG. 7, the controller 2 determines whether the surround back left audio signal SBL and the left outside audio signal LW are included, namely, whether the signals SBL and LW are played back (S25). When the controller 2 makes the negative determination in S25, the processing goes to S27. On the other hand, when determining that the signals SBL and LW are played back (YES in S25), the controller 2 controls the switches 513a and 513c in the on state, and controls the switches 513b and 513d in the off state (S26).

As a result, the surround back left audio signal SBL is amplified by the amplifier 12a, and output to the surround back left SP terminal 14a through the switch S13a. The left outside audio signal LW is amplified by the amplifier 12b, and supplied to the left outside SP terminal 14b through the switch S13c. The left outside audio signal LW is supplied from the DAC 11b to the left outside pre-out terminal 11d through the switch S11c. At this point, in order to supply the left outside audio signal LW to the left outside pre-out terminal 11d, the DAC 11c is not used, but the DAC 11b is used. Accordingly, an effect to enable the DAC 11c to be used for another signal (for example, the HDMI signal of ZONE2) is obtained.

(The Case that Signals LH and LW are Included)

As illustrated in FIG. 6, the controller 2 determines whether the left upside audio signal LH and the left outside audio signal LW are included, namely, whether the signals LH and LW are played back (S9). When the controller 2 makes the negative determination in S9, the processing goes to S12. On the other hand, when determining that the signals LH and LW are played back (YES in S9), the controller 2 inputs the left outside audio signal LW from the DSP to the DAC 11a, and inputs the left upside audio signal LH from the DSP to the DAC 11b (S10). The left outside audio signal LW is not input from the DSP to the DAC 11c. The controller 2 controls the switch 11b in the on state (S11), and controls the switches 11a and 11c in the off state.

As illustrated in FIG. 7, the controller 2 determines whether the left upside audio signal LH and the left outside audio signal LW are included, namely, whether the signals LH and LW are played back (S27). When the controller 2 makes the negative determination in S27, the processing goes to S29. On the other hand, when determining that the signals LH and LW are played back (YES in S27), the controller 2 controls the switches S13b and S13d in the on state, and controls the switches S13a and S13c in the off state (S28).

As a result, the left outside audio signal LW is amplified by the amplifier 12a, and output to the left outside SP terminal 14b through the switch S13b. The left upside audio signal LH is amplified by the amplifier 12b, and supplied to the left upside SP terminal 14c through the switch S13d. The left outside audio signal LW is supplied from the DAC 11a to the left outside pre-out terminal 11d through the switch S11b. At this point, in order to supply the left outside audio signal LW to the left outside pre-out terminal 11d, the DAC 11c is not used, but the DAC 11a is used. Accordingly, an effect to enable the DAC 11c to be used for another signal (for example, the HDMI signal of ZONE2) is obtained.

(The Case that Only Signal SBL is Included)

As illustrated in FIG. 6, the controller 2 determines whether only the surround back left audio signal SBL is included, namely, whether only the signal SBL is played back (S12). When the controller 2 makes the negative determination in S12, the processing goes to S14. On the other hand, when determining that only the signal SBL is played back (YES in S12), the controller 2 inputs the surround back left audio signal SBL from the DSP to the DAC 11a (S13). The left outside audio signal LW is not input from the DSP to the DAC 11c. The controller 2 controls the switches 11a, 11b, and 11c in the off state.

As illustrated in FIG. 7, the controller 2 determines whether only the surround back left audio signal SBL is included, namely, whether only the signal SBL is played back (S29). When the controller 2 makes the negative determination in S29, the processing goes to S31. On the other hand, when determining that only the signal SBL is played back (YES in S29), the controller 2 controls the switch S13a in the on state, and controls the switches S13b, S13c, and S13d in the off state (S30).

As a result, the surround back left audio signal SBL is amplified by the amplifier 12a, and output to the surround back left SP terminal 14a through the switch S13a.

(The Case that Only Signal LH is Included)

As illustrated in FIG. 6, the controller 2 determines whether only the left upside audio signal LH is included, namely, whether only the signal LH is played back (S14). When the controller 2 makes the negative determination in S14, the processing goes to S16. On the other hand, when determining that only the signal LH is played back (YES in S14), the controller 2 inputs the left upside audio signal LH from the DSP to the DAC 11b (S15). The left outside audio signal LW is not input from the DSP to the DAC 11c. The controller 2 controls the switches 11a, 11b, and 11c in the off state.

As illustrated in FIG. 7, the controller 2 determines whether only the left upside audio signal LH is included, namely, whether only the signal LH is played back (S31). When the controller 2 makes the negative determination in S31, the processing goes to S33. On the other hand, when determining that only the signal LH is played back (YES in S31), the controller 2 controls the switch S13d in the on state, and controls the switches S13a, S13b, and S13c in the off state (S32).

As a result, the left upside audio signal LH is amplified by the amplifier 12b, and supplied to the left upside SP terminal 14c through the switch S13d.

(The Case that Only Signal LW is Included (1))

As illustrated in FIG. 6, the controller 2 determines whether only the left outside audio signal LW is included, namely, whether only the signal LW is played back (S16). When the controller 2 makes the negative determination in S16, the processing returns to S1. On the other hand, when determining that only the signal LW is played back (YES in S16), the controller 2 inputs the left outside audio signal LW from the DSP to the DAC 11a (S17). The left outside audio signal LW is not input from the DSP to the DAC 11c. The controller 2 controls the switch S11b in the on state (S18), and controls the switches S11a and S11c in the off state.

As illustrated in FIG. 7, the controller 2 determines whether only the left outside audio signal LW is included, namely, whether only the signal LW is played back (S33). When the controller 2 makes the negative determination in S33, the processing returns to S21. On the other hand, when determining that only the signal LW is played back (YES in S33), the controller 2 controls the switch S13b in the on state, and controls the switches S13a, S13c, and S13d in the off state (S34).

As a result, the left outside audio signal LW is amplified by the amplifier 12a, and output to the left outside SP terminal 14b through the switch S13b. The left outside audio signal LW is supplied from the DAC 11a to the left outside pre-out terminal 11d through the switch S11b. At this point, in order to supply the left outside audio signal LW to the left outside pre-out terminal 11d, the DAC 11c is not used, but the DAC 11a is used. Accordingly, an effect to enable the DAC 11c to be used for another signal (for example, the HDMI signal of ZONE2) is obtained.

(The Case that Only Signal LW is Included (2))

The following pieces of processing may be performed instead of S17, S18, and S34. When determining that only the left outside audio signal LW is included, namely, when determining that only the signal LW is played back, the controller 2 inputs the left outside audio signal LW from the DSP to the DAC 11b. The left outside audio signal LW is not input from the DSP to the DAC 11c. The controller 2 controls the switch S11c in the on state, and controls the switches 11a and 11b in the off state.

When determining that only the left outside audio signal LW is included, namely, when determining that only the signal LW is played back, the controller 2 controls the switch S13c in the on state, and controls the switches S13a, S13b, and S13d in the off state.

As a result, the left outside audio signal LW is amplified by the amplifier 12b, and output to the left outside SP terminal 14b through the switch S13c. The left outside audio signal LW is supplied from the DAC 11b to the left outside pre-out terminal 11d through the switch S11c. At this point, in order to supply the left outside audio signal LW to the left outside pre-out terminal 11d, the DAC 11c is not used, but the DAC 11b is used. Accordingly, an effect to enable the DAC 11c to be used for another signal (for example, the HDMI signal of ZONE2) is obtained.

Through the above pieces of processing, the variation of the pre-out terminal that outputs the left outside audio signal LW, which is caused by the difference of the channel information on the input signal included in the multichannel audio data supplied from the audio processing unit 5, can be prevented to always output the left outside audio signal LW from the left outside pre-out terminal 11d. The DAC 11c is not used in order to supply the left outside audio signal LW to the left outside pre-out terminal 11d, so that the DAC 11c can be used for another signal (for example, the HDMI signal of ZONE2).

Figure 8:
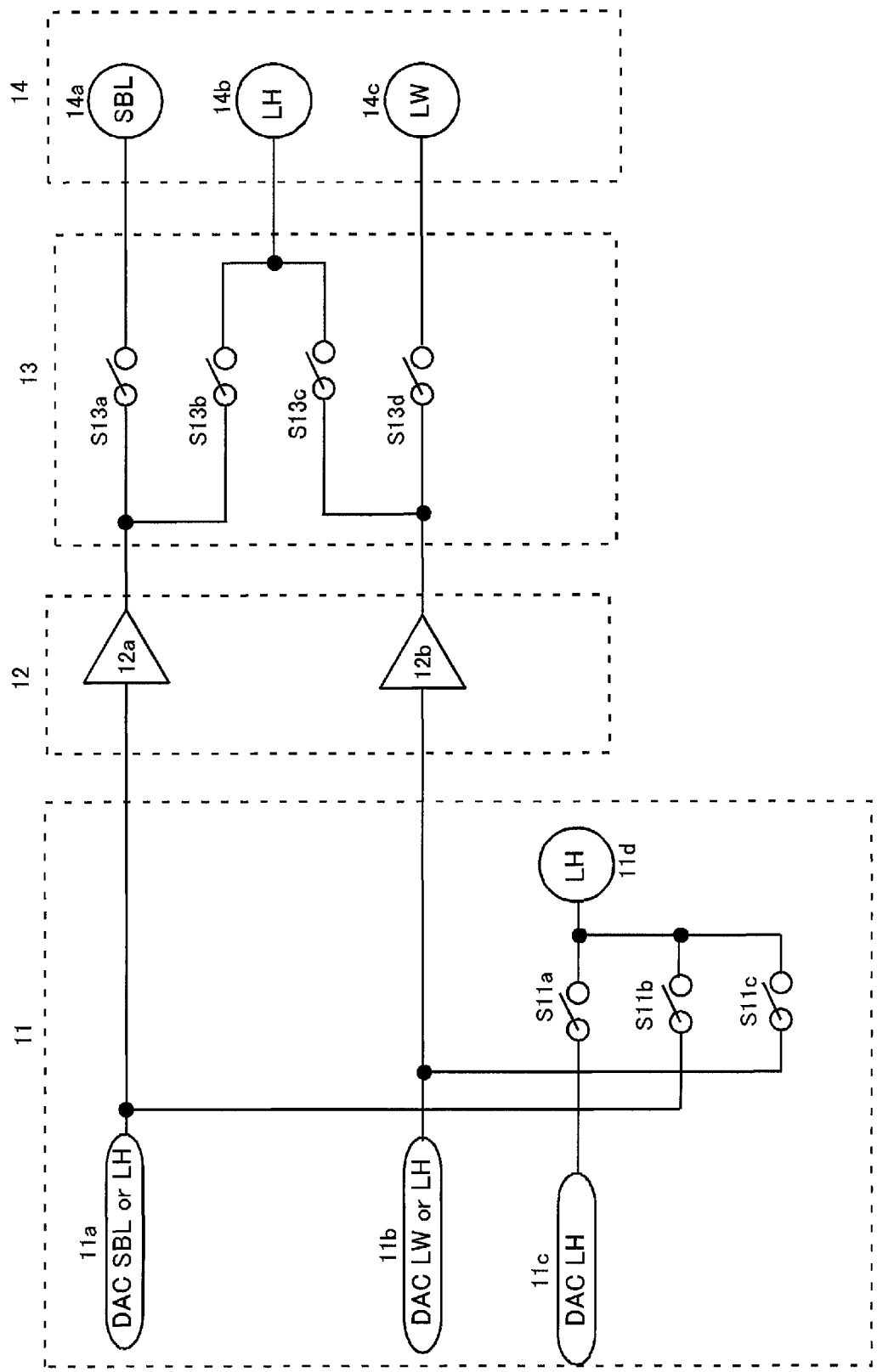
FIG. 8 is a view illustrating the audio processing unit.
Figure 9:
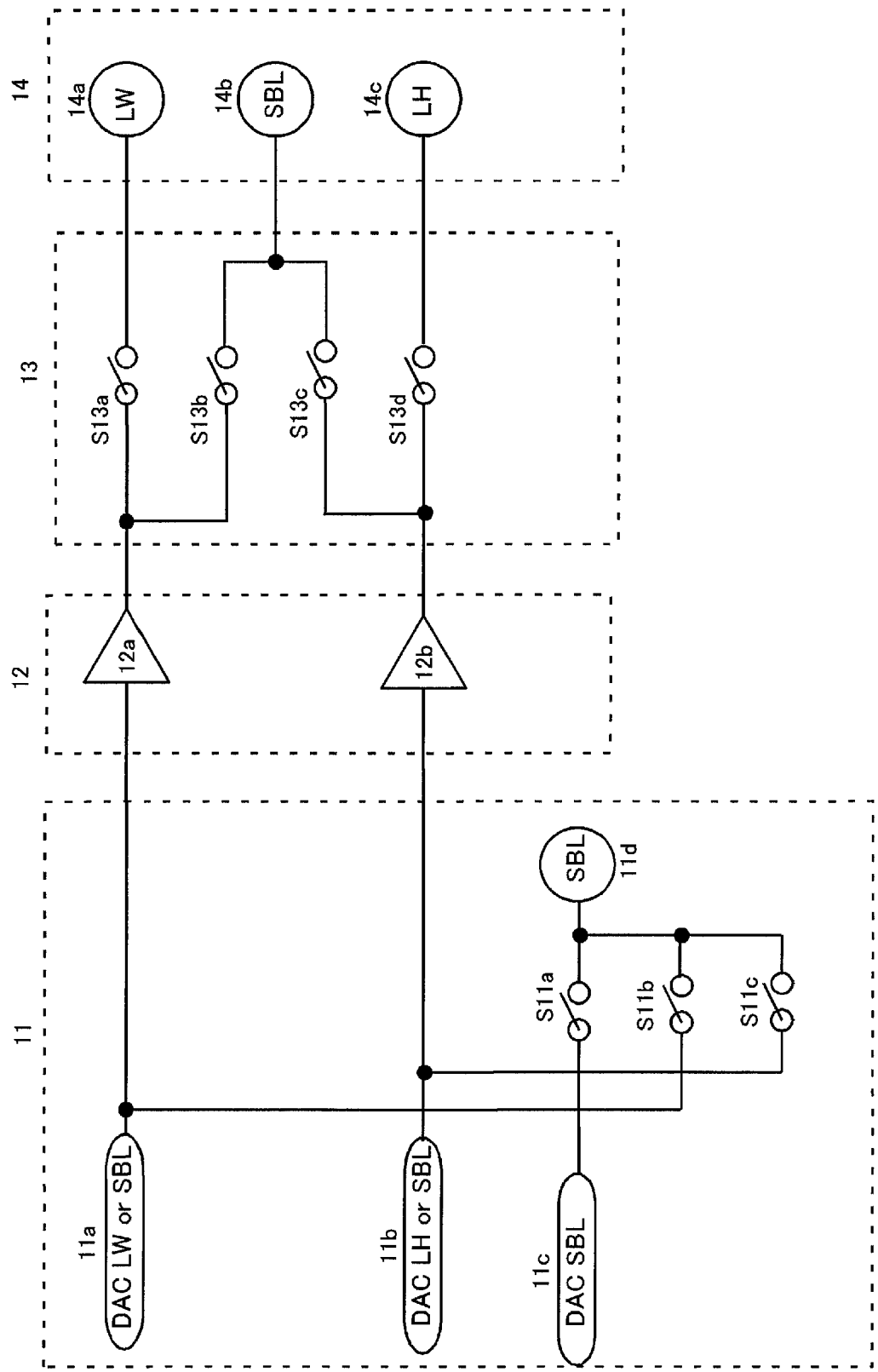
FIG. 9 is a view illustrating the audio processing unit.

A second embodiment of the present invention will be described below. A circuit configuration, in which the left outside audio signal LW and the left upside audio signal LH are replaced with each other while the right outside audio signal RW and the right upside audio signal RH are replaced with each other, may be used in the second embodiment as illustrated in FIG. 8. A circuit configuration, in which the left outside audio signal LW and the surround back left audio signal SBL are replaced with each other while the right outside audio signal RW and surround back right audio signal SBR are replaced with each other, may be used in the second embodiment as illustrated in FIG. 9.

Figure 10:
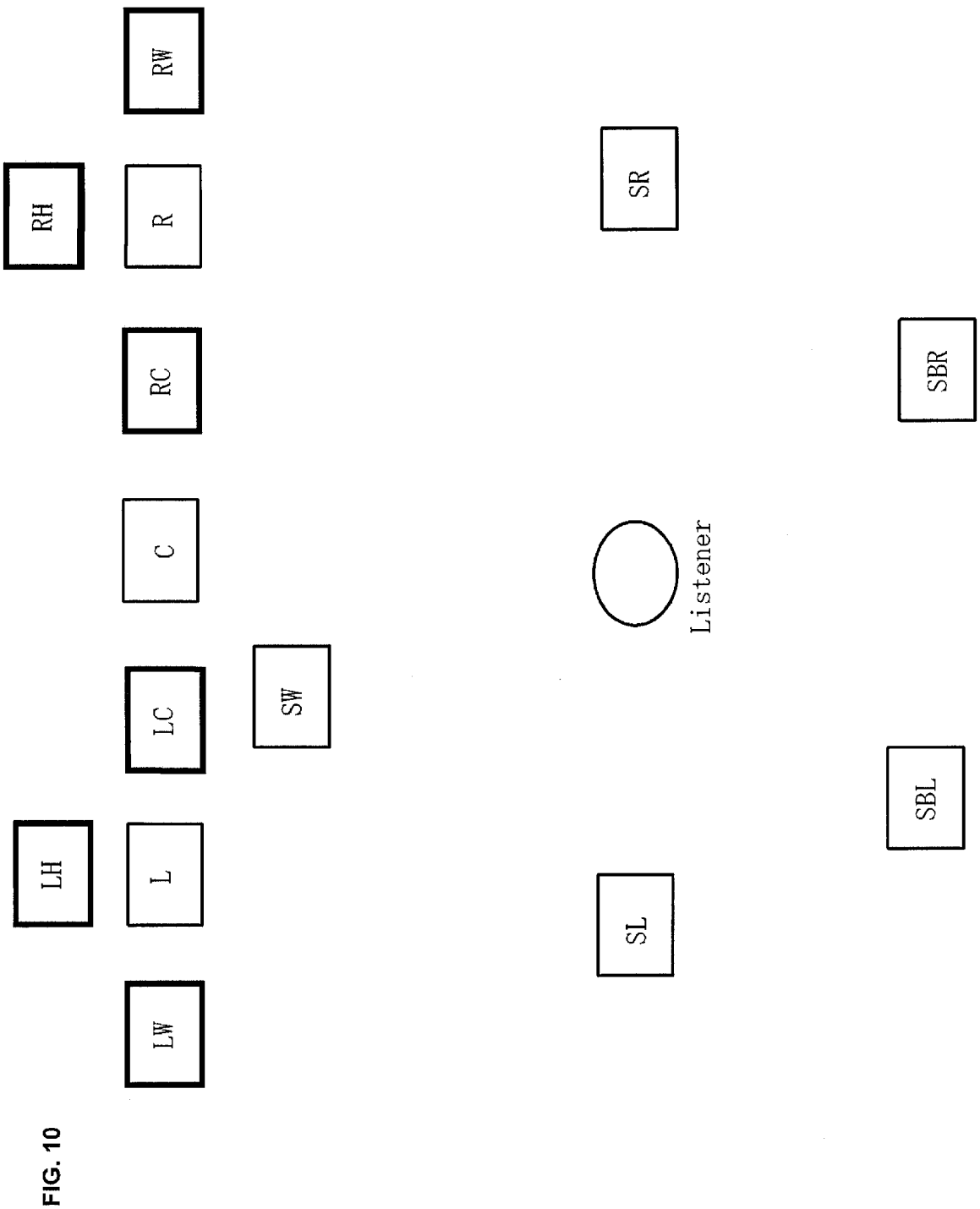
FIG. 10 is a view illustrating channels of audio signals.

A third embodiment of the present invention will be described below. As illustrated in FIG. 10, in the third embodiment, a left-central-side audio signal LC exists instead of (or in addition to) the left outside audio signal LW, and a right-central-side audio signal RC exists instead of (or in addition to) the right outside audio signal RW. The left-central-side audio signal LC is played back from a position between the left audio signal L and the central audio signal C. The right-central-side audio signal RC is played back from a position between the right audio signal R and the central audio signal C. In this case, as illustrated in FIG. 11, a circuit configuration in which the left outside audio signal LW is replaced with the left-central-side audio signal LC while the right outside audio signal RW is replaced with the right-central-side audio signal RC may be used.

Figure 11:
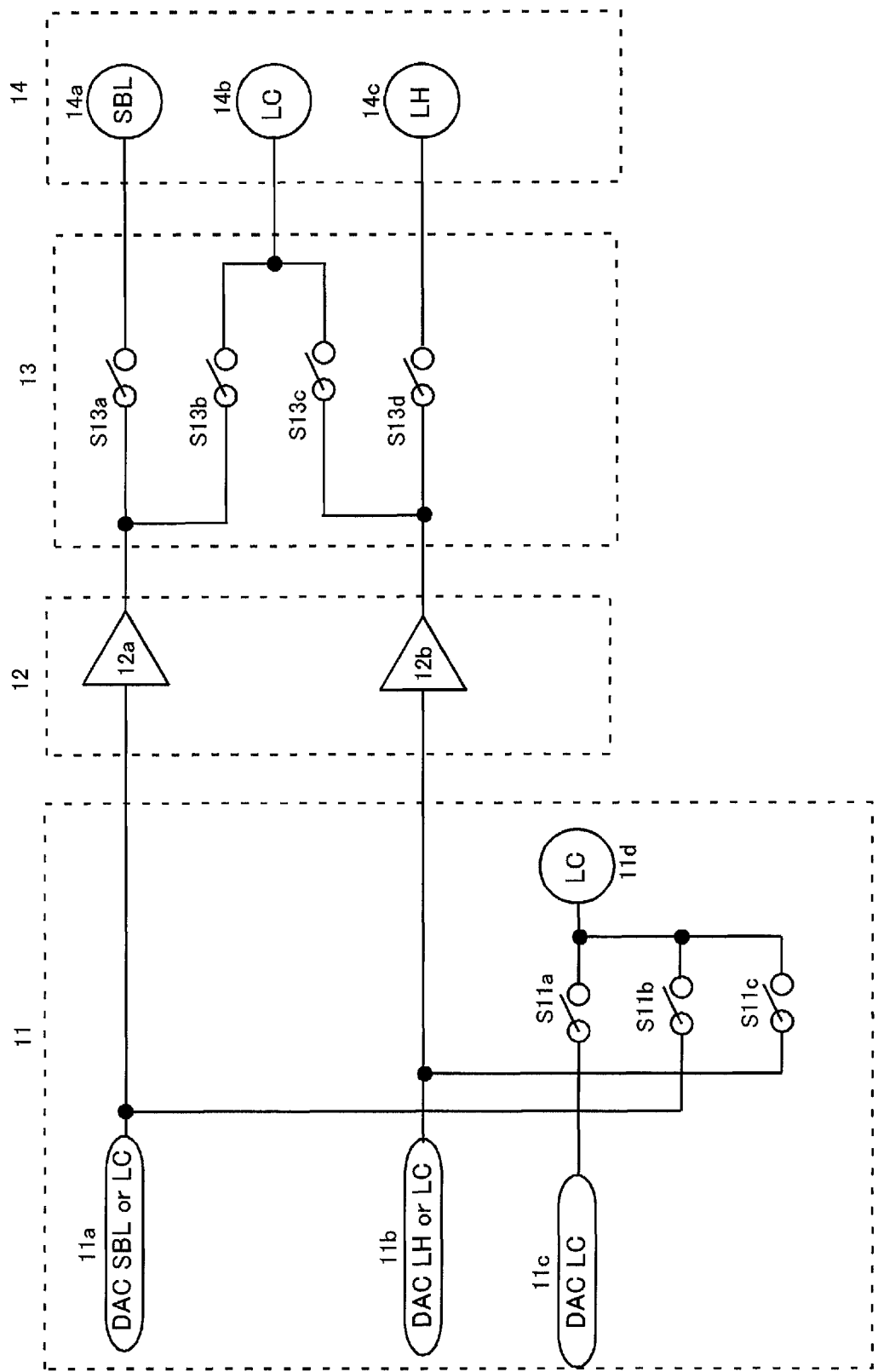
FIG. 11 is a view illustrating the audio processing unit.
Figure 12:
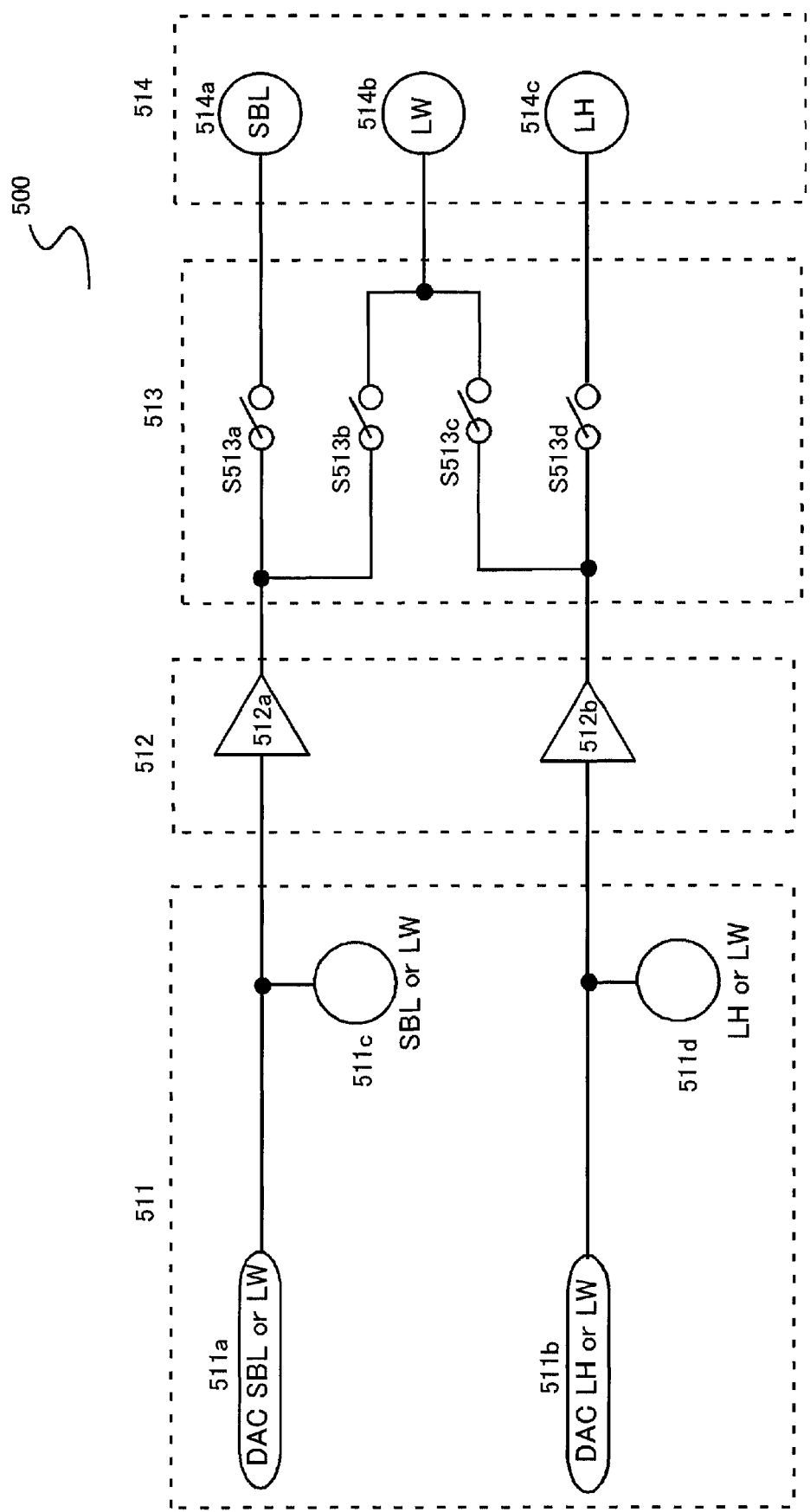
FIG. 12 is a view illustrating an audio processing unit of the related art.

When the second embodiment is generally expressed in consideration of the circuit configuration in FIG. 11, the surround back left audio signal SBL is defined as a first extended left audio signal, the surround back right audio signal SBR is defined as a first extended right audio signal, the left outside audio signal LW is defined as a second extended left audio signal, the right outside audio signal RW is defined as a second extended right audio signal, the left upside audio signal LH is defined as a third extended left audio signal, and the right upside audio signal RH is defined as a third extended right audio signal.

The first extended left audio signal may be any one of the surround back left audio signal SBL, the left outside audio signal LW, the left upside audio signal LH, and the left-central-side audio signal LC. The second extended left audio signal may be anyone of the surround back left audio signal SBL, the left outside audio signal LW, the left upside audio signal LH, and the left-central-side audio signal LC, and the channel of the second extended left audio signal may be different from that of the first extended left audio signal. The third extended left audio signal may be any one of the surround back left audio signal SBL, the left outside audio signal LW, the left upside audio signal LH, and the left-central-side audio signal LC, and the channel of the third extended left audio signal may be different from that of each of the first extended left audio signal and the second extended left audio signal.

Similarly the first extended right audio signal may be any one of the surround back right audio signal SBR, the right outside audio signal RW, the right upside audio signal RH, and the right-central-side audio signal RC. The second extended right audio signal may be any one of the surround back right audio signal SBR, the right outside audio signal RW, the right upside audio signal RH, and the right-central-side audio signal RC, and the channel of the second extended right audio signal may be different from that of the first extended right audio signal. The third extended right audio signal may be any one of the surround back right audio signal SBR, the right outside audio signal RW, the right upside audio signal RH, and the right-central-side audio signal RC, and the channel of the third extended right audio signal may be different from that of each of the first extended left audio signal and the second extended left audio signal.

At least one of the configuration in which the selected audio signal is amplified in the first extended left audio signal, the second extended left audio signal, and the third extended left audio signal and the configuration in which the selected audio signal is amplified in the first extended right audio signal, the second extended right audio signal, and the third extended right audio signal is necessary for the present invention. That is, it is not necessary to include both the configuration in which the selected audio signal is amplified in the first extended left audio signal, the second extended left audio signal, and the third extended left audio signal and the configuration in which the selected audio signal is amplified in the first extended right audio signal, the second extended right audio signal, and the third extended right audio signal.

The embodiments of the present invention are described above, the present invention is not limited to the embodiments. A program that makes a computer to execute the operation of the AV amplifier and a recording medium in which the program is recorded may be provided.

The present invention is suitably applied to the AV amplifier and the like.

What is claimed is:

1. An audio processing apparatus comprising:
a first amplifier that amplifies a first extended audio signal or a second extended audio signal, the first extended audio signal being a first extended left audio signal or a first extended right audio signal, and the second extended audio signal being a second extended left audio signal or a second extended right audio signal;
a second amplifier that amplifies the second extended audio signal or a third extended audio signal, the third extended audio signal being a third extended left audio signal or a third extended right audio signal;
a first digital-analog converter that supplies one of the first extended audio signal and the second extended audio signal to the first amplifier;
a second digital-analog converter that supplies one of the second extended audio signal and the third extended audio signal to the second amplifier;
a third digital-analog converter that outputs the second extended audio signal to a second extended audio signal pre-out terminal;
a first speaker terminal that outputs the first extended audio signal;
a second speaker terminal that outputs the second extended audio signal;
a third speaker terminal that outputs the third extended audio signal;
a first switch that switches whether the first extended audio signal is supplied from the first amplifier to the first speaker terminal;
a second switch that switches whether the second extended audio signal is supplied from the first amplifier to the second speaker terminal;
a third switch that switches whether the second extended audio signal is supplied from the second amplifier to the second speaker terminal;
a fourth switch that switches whether the third extended audio signal is supplied from the second amplifier to the third speaker terminal;
a fifth switch that switches whether the second extended audio signal is supplied from the third digital-analog converter to the second extended audio signal pre-out terminal;
a sixth switch that switches whether the second extended audio signal is supplied from the first digital-analog converter to the second extended audio signal pre-out terminal;
a seventh switch that switches whether the second extended audio signal is supplied from the second digital-analog converter to the second extended audio signal pre-out terminal;
a channel determination unit that determines whether the first extended audio signal, the second extended audio signal, or the third extended audio signal is included in multichannel audio data; and
a switching controller that causes the first switch to supply the first extended audio signal amplified by the first amplifier to the first speaker terminal, causes the fourth switch to supply the third extended audio signal amplified by the second amplifier to the third speaker terminal, and causes the fifth switch to supply the second extended audio signal from the third digital-analog converter to the second extended audio signal pre-out terminal when determining that all the first extended audio signal, the second extended audio signal, and the third extended audio signal are included, the switching controller causing the first switch to supply the first extended audio signal amplified by the first amplifier to the first speaker terminal, causing the third switch to supply the second extended audio signal amplified by the second amplifier to the second speaker terminal, and causing the seventh switch to supply the second extended audio signal from the second digital-analog converter to the second extended audio signal pre-out terminal when determining that the first extended audio signal and the second extended audio signal are included, the switching controller causing the second switch to supply the second extended audio signal amplified by the first amplifier to the second speaker terminal, causing the fourth switch to supply the third extended audio signal amplified by the second amplifier to the third speaker terminal, and causing the sixth switch to supply the second extended audio signal from the first digital-analog converter to the second extended audio signal pre-out terminal when determining that the second extended audio signal and the third extended audio signal are included.

2. The audio processing apparatus according to claim 1, wherein the first extended left audio signal is any one of a surround back left audio signal, a left outside audio signal, a left upside audio signal, and a left-central-side audio signal, and the first extended right audio signal is any one of a surround back right audio signal, a right outside audio signal, a right upside audio signal, and a right-central-side audio signal, the second extended left audio signal is any one of the surround back left audio signal, the left outside audio signal, the left upside audio signal, and the left-central-side audio signal and is different from the first extended left audio signal, the second extended right audio signal is any one of the surround back right audio signal, the right outside audio signal, the right upside audio signal, and the right-central-side audio signal and is different from the first extended right audio signal, the third extended left audio signal is any one of the surround back left audio signal, the left outside audio signal, the left upside audio signal, and the left-central-side audio signal and is different from the first extended left audio signal and the second extended left audio signal, the third extended right audio signal is any one of the surround back right audio signal, the right outside audio signal, the right upside audio signal, and the right-central-side audio signal and is different from the first extended right audio signal and the second extended right audio signal.

* * * * *